US010161455B2

(12) United States Patent
Balster et al.

(10) Patent No.: US 10,161,455 B2
(45) Date of Patent: Dec. 25, 2018

(54) ROLLER BEARING REPLACEMENT DEVICE AND PROCESS FOR SWITCHING ROLLER BEARINGS

(71) Applicant: LOI Thermprocess GmbH, Essen (DE)

(72) Inventors: Frank Balster, Nottuln (DE); Horst Wachholder, Essen (DE)

(73) Assignee: LOI Thermprocess GmbH, Essen (DE)

( * ) Notice: Subject to any disclaimer, the term of this patent is extended or adjusted under 35 U.S.C. 154(b) by 319 days.

(21) Appl. No.: 15/000,700

(22) Filed: Jan. 19, 2016

(65) Prior Publication Data
US 2016/0208861 A1 Jul. 21, 2016

(30) Foreign Application Priority Data

Jan. 20, 2015 (EP) .................... 15151782
Jan. 21, 2015 (EP) .................... 15151976
Jan. 22, 2015 (EP) .................... 15152140

(51) Int. Cl.
F16C 35/06 (2006.01)
F16C 19/54 (2006.01)
F27B 3/10 (2006.01)
F27B 9/24 (2006.01)
F27B 9/30 (2006.01)
F27D 9/00 (2006.01)

(52) U.S. Cl.
CPC ............ F16C 35/062 (2013.01); F16C 19/54 (2013.01); F27B 3/10 (2013.01); F27B 9/2407 (2013.01);
(Continued)

(58) Field of Classification Search
CPC ..... F27B 9/2407–9/2423; F27B 9/2469; F27B 9/30; F27B 9/047; F27B 3/10; F27B 3/24;
(Continued)

(56) References Cited

U.S. PATENT DOCUMENTS

| 5,819,354 A | 10/1998 | Alonso | |
| 2011/0185793 A1 | 8/2011 | Harrison | |
| 2014/0165404 A1* | 6/2014 | Ebner | C21D 9/0012 29/895.1 |

FOREIGN PATENT DOCUMENTS

DE 202005006587 9/2005
DE 10 2007 004158 7/2008
(Continued)

OTHER PUBLICATIONS

European Search Report filed in EP 15151782 dated Aug. 6, 2015.
(Continued)

Primary Examiner — Jun Yoo
(74) Attorney, Agent, or Firm — Rankin, Hill & Clark LLP

(57) ABSTRACT

A roller bearing replacement device for replacement or exchange of a roller bearing of a roller hearth furnace includes a housing that can be sealed off against the external atmosphere with a sluice through which it is possible to access to a roller bearing of the roller hearth furnace that is to be demounted from inside the housing while excluding the environmental atmosphere, and at least one roller bearing handling device designed and constructed for demounting and installing roller bearings that is arranged in a moveable manner in the housing and can at least partly be moved out of the housing through the sluice. The sluice has a docking flange and a gas tightness monitoring arrangement, by means of which the gas-tightness of the docking connection on to the roller hearth furnace by the sluice can be monitored.

7 Claims, 3 Drawing Sheets

(52) U.S. Cl.
CPC ........ *F27B 9/30* (2013.01); *F27D 2009/0021* (2013.01)

(58) Field of Classification Search
CPC .... F27B 3/00; F27B 17/0016; F27B 17/0083; F27B 2017/0091; F16C 35/062; F16C 19/54; F16C 37/00; F16C 37/007; F16C 3/0026–3/0028; F16C 25/00
See application file for complete search history.

(56) References Cited

FOREIGN PATENT DOCUMENTS

| | | |
|---|---|---|
| DE | 102008012739 | 9/2009 |
| DE | 10 2011 079771 | 1/2013 |
| DE | 102011079771 | 1/2013 |
| EP | 0033845 | 8/1981 |
| FR | 2966553 | 4/2012 |
| GB | 2220732 | 1/1990 |
| JP | 2009145120 | 7/2009 |
| KR | 20030053400 | 6/2003 |
| WO | 03027561 | 4/2003 |
| WO | 2013152419 | 10/2013 |

OTHER PUBLICATIONS

Austrian Search Report dated Jul. 13, 2015.
Search Report of EP 15152140.8 dated Jun. 8, 2016, 3 pages.
Search Report of EP 15151976.6 dated Jun. 8, 2016, 3 pages.

\* cited by examiner

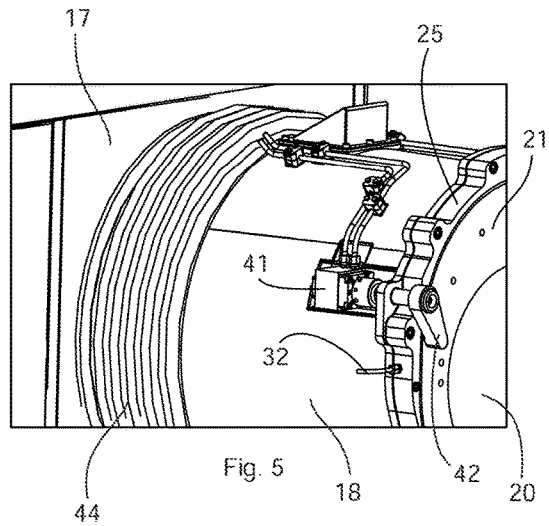
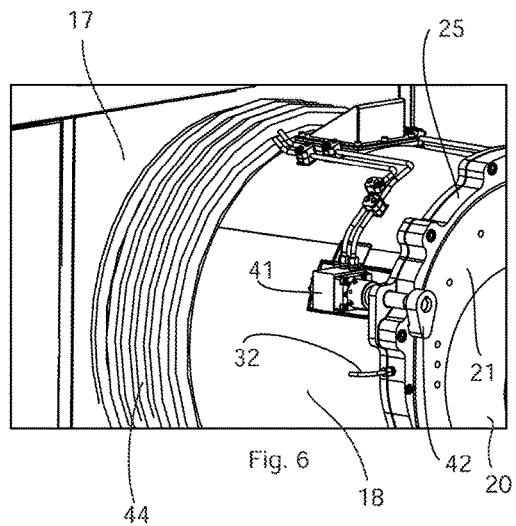
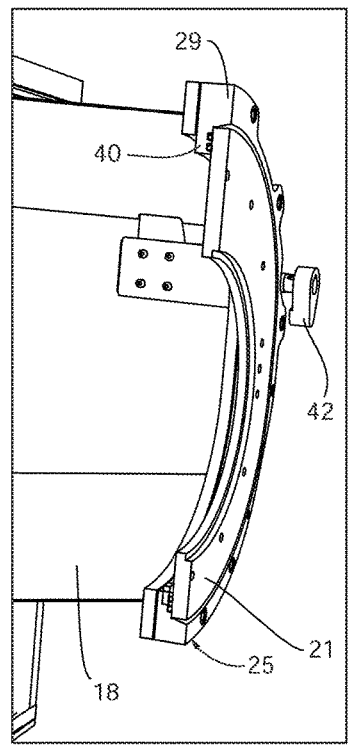
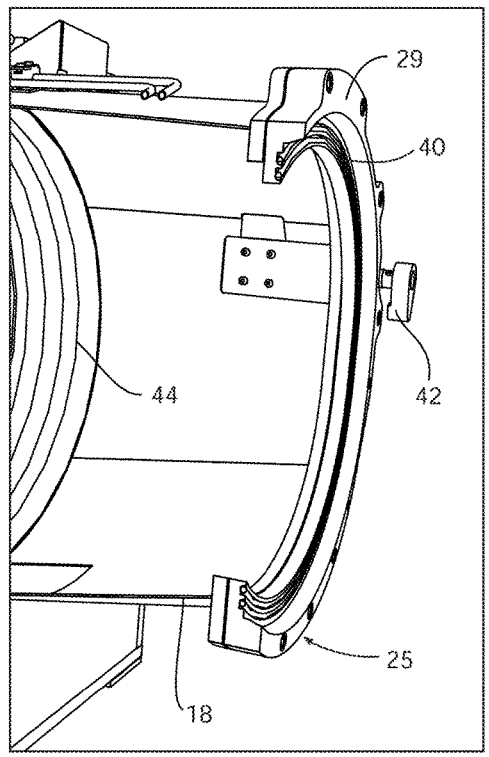

ROLLER BEARING REPLACEMENT DEVICE AND PROCESS FOR SWITCHING ROLLER BEARINGS

BACKGROUND

The invention relates to a roller bearing replacement device for replacement or exchange of a roller bearing of a roller hearth furnace comprising: a housing that is sealed off from the external atmosphere, which has a sluice that can be coupled on the roller hearth furnace through which access to a roller bearing that is to be demounted is possible from the inside of the housing while excluding the external atmosphere, and at least one roller bearing handling device for demounting and installing roller bearings that is arranged moveably in the housing and is designed so it can be moved out at least partially through the sluice.

The invention further relates to an assembly with a roller hearth furnace for heat treatment of work pieces and a roller bearing handling device that is designed and constructed for replacement of roller bearings, in which the roller bearing has a bearing support with a flange on the side that is assigned for the roller bearing replacement device for each roller bearing that is to be placed, and in which the roller bearing replacement device has a housing that is sealed off from the external environment or atmosphere, which has a sluice that can be coupled on the roller hearth furnace, and through which access to a roller bearing that is to be replaced from the inside of the housing is possible while excluding the external atmosphere, and at least one roller bearing handling device that is designed and constructed for demounting and installing roller bearings, that is arranged in a moveable manner in the housing and can at least partly be moved out of the sluice.

Finally the invention relates to a process for replacement or exchange of roller bearings of a roller hearth furnace by means of a roller bearing replacement device, in which the roller bearing replacement device is moved laterally near the roller hearth furnace to the position of the roller bearing that is to be replaced, the roller bearing is decoupled from a drive unit and then the roller bearing replacement device is moved towards the roller hearth furnace to the roller bearing that is to be demounted, in which a sluice of the roller bearing replacement device is coupled in a gas-tight manner on the roller bearing furnace.

A roller bearing replacement device of the type identified at the start is for example known from the patent DE 10 2011 079 771 A1, in which from this application a process for roller bearing replacement according to the type identified at the start is also to be taken. This known roller bearing replacement device is moveable laterally near the roller hearth furnace and has an enclosed carrier roller bearing handling device, i.e. a roller bearing replacement device housed in a housing of the roller bearing replacement device. For roller bearing exchange or replacement, the roller bearing replacement device is moved alongside the longitudinal axis of the furnace and positioned at the appropriate exchange position. Then a sluice of the roller bearing replacement device is screwed on in a gas-tight manner to the roller bearing replacement device, so that a gas-tight insulation exists between the inside of the housing of the roller bearing replacement device and the environment. In case of a roller bearing replacement, a lance of the roller bearing handling device travels into the hollow roller bearing in order to lift the roller bearing that is to be replaced and to pull the roller bearing out of an opening that is designed and constructed in the wall of the roller hearth furnace, in which the roller bearing is placed in a rotatable manner while in operation. In this roller bearing replacement device it is assumed that the screwed on flange connection ensures absolute gas-tightness, without a monitoring of the gas-tightness taking place directly after the docking of the roller bearing replacement device on the roller hearth furnace or even during the roller bearing replacement or exchange process. In addition, the screwing on to create a flange joint represents a disadvantageous expense, that is circumstantially time-consuming and for which personnel need to be deployed and used.

SUMMARY

The aim of the invention is to create a solution for a roller bearing replacement device in a simple manner of design and construction, in which the disadvantages known of the state of the art are avoided and in which the gas-tightness of the docking connection between the roller bearing replacement device and the roller hearth furnace can be checked and monitored during the roller bearing replacement process.

In a roller bearing replacement device of the type mentioned at the start, the task is achieved in the following manner: the sluice has a docking flange and gas-tightness monitoring arrangement, by which the gas-tightness of the docking connection of the sluice to the roller hearth furnace can be checked.

Furthermore, in an assembly of the type mentioned at the start which includes a roller bearing replacement device and a roller hearth furnace, the task is achieved in the following manner: the sluice has a docking flange and gas-tightness monitoring arrangement, by which the gas-tightness of the docking connection can be checked at the flange of the docking connection.

Finally in a process of the type mentioned at the beginning, the task is accomplished according to the invention in the following manner: during docking between a flange of the roller hearth furnace and a docking flange of the sluice a monitoring chamber is designed and constructed, in which a pressure monitoring fluid is introduced for monitoring the gas-tightness of the docking connection.

Advantageous and purposeful embodiments and further advantageous modifications of the invention are the subject matter of the sub claims.

Through the invention, a possibility is made available in a simple manner by which the connection between roller bearing replacement device and roller hearth furnace can be checked for gas-tightness, in order to ensure that a replacement or exchange of a roller bearing takes place while excluding the outer environmental atmosphere. The possibility of a monitoring attained with the invention contributes to a large extent to increasing the reliability during a roller bearing exchange or replacement, without needing the heat treatment process to be interrupted for a long time during the exchange or replacement. Since the temperature of the roller hearth furnace for roller bearing exchange or replacement can be reduced to only about 800° C. according to the invention, through this the heating-up time for taking up production can be kept short. Since usually for a manual exchange or replacement of a roller bearing, the roller hearth furnace must be reduced to below 200° C., this represents an enormous expense of time both for the cooling down and for the heating up for starting production. In the known state of the art or technology, use has not yet been made of monitoring the gas-tightness as provided for according to the invention, nor has such a possibility been conceived of. According to the invention whereby gas-tightness can be monitored, it becomes possible to carry out a roller bearing exchange or replacement automated to the largest extent possible.

In an embodiment of the roller bearing replacement device according to the invention as well as the assembly in accordance with the invention it is provided for that the gas-tightness monitoring includes a fluid feeding element that feeds a monitoring fluid for the purpose of monitoring the gas-tightness and at least two sealing elements that are arranged on different radials of the docking flange, in which the at least two sealing elements are designed and constructed in the form of rings and between which they form a radial gap in which the fluid feeding element opens out. With the help of this embodiment or design of the roller bearing, when the roller bearing replacement device is docked on the roller hearth furnace, the radial gap is covered by the roller hearth furnace, so that a radial hollow space is formed between the docking flange and the roller hearth furnace. This hollow space is then used for monitoring the seal tightness by leading a monitoring fluid through the fluid feeding element into the hollow space or the radial gap as the case may be; this monitoring fluid builds up a pressure that remains constant when the gas-tightness remains or exists. In this way, the gas-tightness of the docking connection can be checked in an easy manner.

Accordingly, the invention provides for in the design or embodiment of the assembly, that in case the sluice is coupled with the roller hearth furnace, the radial gap of the docking flange and the flange of the roller hearth furnace form a monitoring chamber, in which the fluid leading element introduces the monitoring fluid for monitoring the seal-tightness of the docking connection. The monitoring chamber consequently corresponds to the hollow space described above, which is defined as well as is formed by the radial gap of the docking flange and the roller hearth furnace.

In order to define and specify the seat and the arrangement or assembly of the sealing element on to the docking flange and element, and to improve the hold of the sealing element, the inventions provides in a design or embodiment that each sealing element is arranged or placed in a corresponding radial recess, which is molded or formed out in the docking flange.

In order that the docking flange also lies securely and gas-tight on the roller hearth furnace during a replacement of the roller bearing, the invention provides for in its design or embodiment of the roller bearing replacement device, that the sluice has a clamping system, in which the clamping system is designed and constructed so as to couple the docking flange in a form-locking manner with the roller hearth furnace. With the help of this clamping system, the sluice can be fixed on to the roller hearth furnace, whereby it can be a hydraulically operated system.

A particularly advantageous possibility for realization of a form-locking connection between the docking flange and the roller hearth furnace is provided in the roller bearing replacement device according to the invention by the clamping system having at least one adjustable clamping element, in which at least one clamping element is engaged, gripped with or enmeshed with the roller hearth furnace in the docking position and is disengaged or not in mesh with the roller hearth furnace in the base position.

Correspondingly in the assembly the form-locking connection is then made in especial embodiments in this way, that the sluice has a clamping system that can be adjusted between a docking position and a base position, in which the clamping element engages behind the flange of the roller hearth furnace in the docking position and releases the flange in the base position.

For compensation or adjustment of tolerances it is advantageous when the sluice is built in the form of a socket or nozzle in the design and construction of the roller bearing replacement device and has a compensator.

Finally the invention also related to an embodiment of the process according to the invention, that the gas-tightness of the docking connection is checked and monitored with the help of the pressure that is built up through the pressure monitoring fluid which is introduced in the monitoring chamber in case of gas-tightness.

It shall be understood that the aforementioned and following characteristics shall be applicable or utilizable not only in the respectively mentioned combinations but also in other combinations or as unique characteristics, without departing from the framework of the present invention. The framework of the invention is only defined by the claims.

BRIEF DESCRIPTION OF THE DRAWINGS

Further details, characteristics and advantages of the object of the invention arise from the following description in conjunction with the drawing in which a preferred embodiment of the invention is depicted by way of example. In the drawing are shown:

FIG. 5 is a perspective detail view of a sluice of the roller bearing replacement device with a form-locking connection with the roller hearth furnace, FIG. 6 is a perspective detail view of the sluice of the roller bearing replacement device after the form-locking connection with the roller hearth furnace has been lifted, FIG. 7 is a perspective sectional view of the sluice of the roller bearing replacement device in the docked condition on the flange of the roller hearth furnace, FIG. 8 is another perspective sectional view of the sluice and its docking flange.

DETAILED DESCRIPTION

Figure 1:
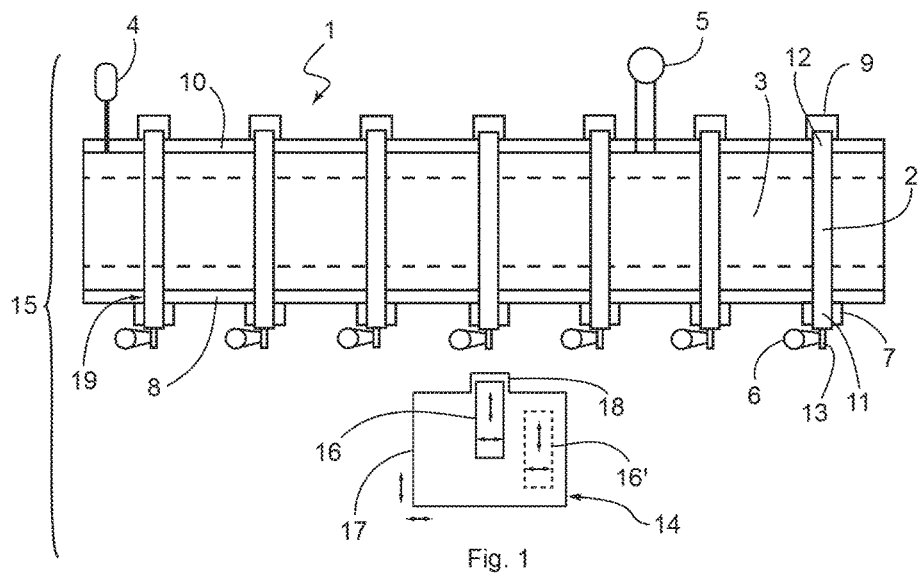
FIG. 1 is a schematic top view of an assembly according to the invention with a roller hearth furnace and a roller bearing replacement device according to the invention which is designed and constructed so as to be moveable laterally along the roller hearth furnace.

In FIG. 1, a systematic top view or plan of a roller hearth furnace 1 is shown in which each of the roller bearings 2 are stored in a rotatable manner by means of a carrier roller bearing system. In the embodiment depicted in FIG. 1, the roller hearth furnace 1 is designed and constructed for continuous heat treatment of steel rolls 3. FIG. 1 is an exemplary depiction and shows only a section of the roller hearth furnace 1. For this sectional view the roller hearth furnace 1 has seven roller bearings 2, in which only one of the seven roller bearings 2 is provided with various reference signs for reasons of clarity. The roller hearth furnace 1 is hermetically sealed from its environment and is operated under a protective atmosphere. The roller bearings 2 are arranged alongside the longitudinal axis of the roller hearth furnace 1 and transport the steel roll 3, in which the process takes place at temperatures exceeding 1000° C. inside the roller hearth furnace 1. A heating unit 4 ensures maintenance of the temperature necessary for the process inside the roller hearth furnace 1, whereas a protective gas device 5 is responsible for regulating the desired protective gas atmosphere inside the roller hearth furnace 1. Each roller bearing 2 is connected outside the roller hearth furnace 1 with a drive unit 6, which drives the rotation of the respective roller bearing 2, in order to transport the steel roll 3 through the roller hearth furnace 1. The bearing system of each of a roller bearing system of each roller bearing 2 not depicted in detail in the Figures includes a first bearing element 7 that is arranged on a first side wall 8 of the roller hearth furnace 1 and which must be detached from the first side wall 8 in case of a roller bearing exchange, and a second bearing element 9 which is placed on the second side wall 10 of the roller hearth furnace 1 that lies on the opposite side of the first side wall 8 and which must not be detached from the second side wall 10 in case of a roller bearing exchange but rather remains there for placement of the new roller bearing 2 that is to be inserted. In the bearing system each roller bearing 2 is placed so that it can rotate in the roller hearth furnace 1 with the first longitudinal end 11 by means of the first bearing element 7 and with the second longitudinal end 12 by means of the second bearing element 9, in which the first bearing element 7 and the second bearing element 9 are both fitted gas-tight with insulation plugs in such a manner that no protective gas can escape from the inside of the roller hearth furnace 1 during the operation of the furnace. From the first longitudinal end 11 of each roller bearing 2, a shaft journal 13 extends out which projects outwards from the respective first bearing element 7 and is connected for drive purposes with an associated drive unit 6, by which each of the roller bearings 2 is rotated during the operation of the roller hearth furnace 1. During a replacement of a roller bearing 2, firstly the drive unit 6 is detached from the shaft journal 13, before the roller bearing 2 that is to be demounted is removed from the roller hearth furnace 1 together with the first bearing element 7, whereas the second bearing element 9 remains in the roller hearth furnace 1 and pivots the roller bearing 2 that is to be inserted.

As FIG. 1 further shows schematically, a roller bearing replacement device 14 is arranged laterally along the roller hearth furnace 1 for replacement of a roller bearing 2 of the roller hearth furnace 1, this device is moveable alongside the first side wall 8 of the roller hearth furnace 1 towards and away from the side wall 8 in order to be positioned before a roller bearing 2 that is to be demounted. The roller bearing replacement device 14 and the roller hearth furnace 1 constitute an assembly 15, which is intended for replacement or exchange of a roller bearing 2. For roller bearing replacement, the first bearing element 7 is detached from the first side wall 8 and the roller bearing 2 that is to be replaced together with the first bearing element 7 is pulled out of the roller hearth furnace 1 with the help of a roller bearing handling device 16 of the roller bearing replacement device 14. In addition to the roller bearing handling device 16, the roller bearing replacement device 14 includes a housing 17 that can be sealed off from the environmental atmosphere, which has a sluice 18 that serves to couple with the roller hearth furnace 1 and through which access to a roller bearing 2 that is to be demounted from the housing 17 while excluding the atmosphere of the environment is possible. The roller bearing handling device 16 is placed moveably in the housing 17 in such a way that it can be moved towards and away from the side wall 8 as also laterally to the sidewall 8. Thus a single roller bearing handling device 16 can be used both for demounting a roller bearing 2 from the roller hearth furnace 1 as well as for installing a new roller bearing 2. It is also conceivable that a roller bearing handling device 16 is used for demounting and subsequently moved away from the furnace, after which another roller bearing handling device 16' that is loaded with the roller bearing 2 that has to be installed is deployed for mounting as shown schematically in FIG. 1. Thus the two roller bearing replacement devices 16 and 16' can be moved inside the gas-tight housing 17, they can be positioned in front of the sluice 18 and furthermore they can be at least partly moved out of the housing 17 through the sluice 18. Such a roller bearing replacement can thus take place with one or two roller bearing handling devices 16, 16', in which the roller hearth furnace 1 is cooled down to 800° C. and is purged or flushed with nitrogen gas before the roller bearing replacement.

Figure 2:
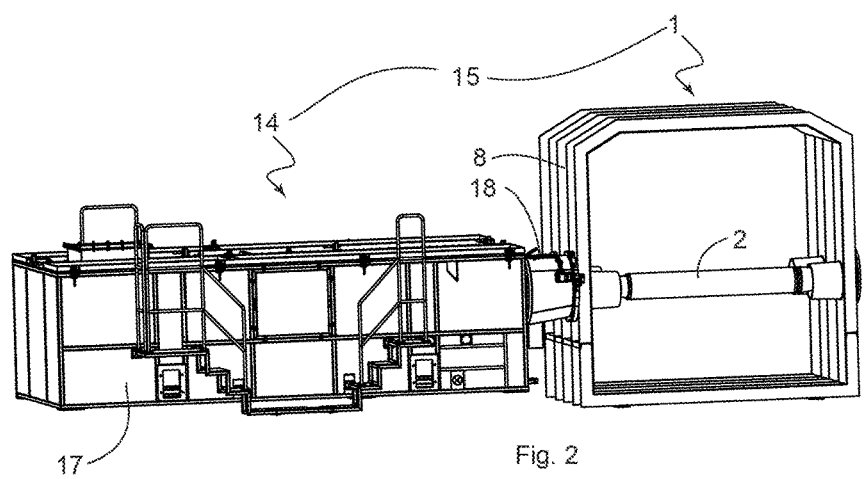
FIG. 2 is a perspective depiction of the roller bearing replacement device that is docked on to the roller hearth furnace.

In order to keep the time required for roller bearing replacement as short as possible and hence minimize downtime, the roller bearing replacement is carried out laterally with respect to the roller hearth furnace 1, in which the operation of the roller bearing handling device 16, 16' takes place shielded from the external environmental atmosphere. Accordingly one or both of the roller bearing handling devices 16, 16' are operated in a housing 17 that is sealed off from the external environment and atmosphere. It is in such a housing 17 then that one or both roller bearing handling devices 16, 16' are arranged moveably and housed. Even in case of a roller bearing replacement with such a gas-tight housing 17 that is hermetically sealed from the external environment, the drive unit 6 is detached from the shaft journal 13 of the roller bearing 2 before the actual roller bearing change. Through the sluice 18, the housing 17 can be docked or coupled in a sealed manner with respect to the outer atmosphere or environment on to the roller hearth furnace 1, as shown in FIG. 2. In the process the sluice 18 encloses the first bearing element 7, which is then removed out of the roller hearth furnace 1 together with the roller bearing 2 that is to be demounted. In other words, either the one or both of the roller bearing handling devices 16, 16' are arranged in a housing 17 that is sealed gas-tight from the outer environment and at least partially extendible out of this through the sluice 18 in a wall of the housing 17, in order to have access to the roller bearing 2 that is to be demounted. After the docking or coupling of the housing 17 on to the roller hearth furnace 1 as shown in FIG. 2, a protective gas atmosphere is introduced into the housing 17 itself which corresponds to the protective gas atmosphere of the inside of the roller hearth furnace 1. When accommodated within the housing 17, the roller bearing handling device 16 or both the roller bearing handling devices 16, 16' can be moved within the housing 17 in at least two spatial directions, as indicated by the arrows in FIG. 1. Additionally the roller bearing replacement device 14 or the housing 17 is moveable in at least two spatial directions, in order to pull up laterally at the desired roller bearing 2 and to draw closer to the first side wall 8 for docking.

Figure 3:
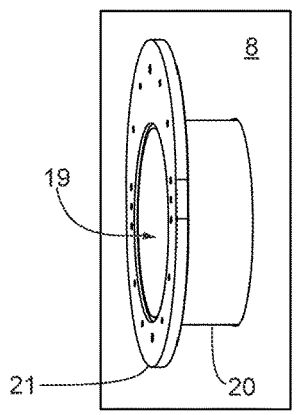
FIG. 3 is a perspective detail view of a flange of the roller hearth furnace.
Figure 4:
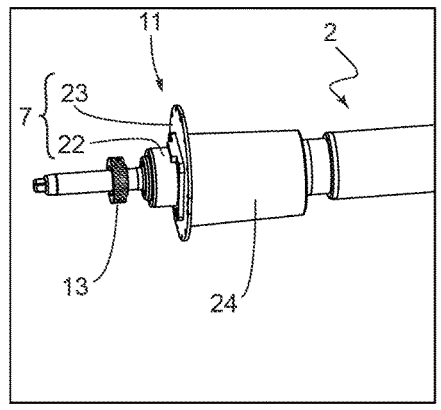
FIG. 4 is a perspective detail view of a longitudinal end of a roller bearing.
Figure 9:
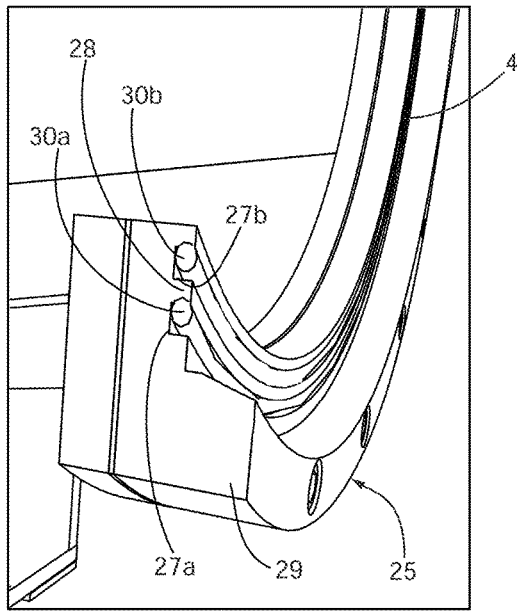
FIG. 9 is yet another perspective sectional view of the sluice and its docking flange.

During roller bearing replacement the roller bearing 2 that is to be replaced is pulled out of an opening 19 (see for example FIG. 1 or FIG. 3) from the first side wall 8 of the roller hearth furnace 1. More accurately said, the roller hearth furnace 1 has, on its first side wall 8, for each roller bearing 2 a nozzle or bearing support 20 with a flange 21, in which each one of the roller bearings 2 is incorporated with its second longitudinal end 12 going right through the opening 19 of the support 20 into the roller hearth furnace 1 and with its first longitudinal end 11 affixed to the flange 21 (see for example FIG. 3). Supports or nipples 20 and flange 21 of the roller hearth furnace 1 are shown only in FIG. 3 but not in the schematic depiction of FIG. 1. With reference to FIG. 4, the first bearing element 7 of a roller bearing 2 includes a bearing housing 22 in which a fixed bearing for rotatable mounting of the first longitudinal end 11 of the roller bearing 2 is incorporated, and a bearing intermediate plate 23 on which the bearing housing 22 sits. The bearing housing 22 is incorporated on the first side wall 8 of the roller hearth furnace 1 through the bearing intermediate plate 23 via the flange or the housing flange 21, in which each of the roller bearing 2 has an insulation plug 24, that is arranged on the first side wall 8 of the roller hearth furnace 1 in case of the fitted roller bearing 2, so that the roller bearing 2 is placed gas-tight in a rotatable manner using the first positioning component 7 on the first side wall 8 of the roller hearth furnace 1. When a roller bearing 2 is to be replaced or exchanged, the screw connection between the bearing intermediate plate 23 and the housing flange 21 is detached, and the first bearing element 7 together with the roller bearing 2 and the insulation plugs 24 is demounted and transported away from the roller hearth furnace 1.

During the pulling out of the roller bearing 2 that is to be replaced and while installing a new roller bearing 2, care must be taken, that the roller bearing replacement takes place in a gas-tight manner and no atmosphere from the environment enters into the inside of the roller hearth furnace 1. As already mentioned above, the bearing intermediate plate 23 seals up the housing flange 21 in the mounted state of the roller bearing 2. Moreover the bearing intermediate plate 23 has the important function of providing and ensuring gas-tightness during the processes for demounting and installing the roller bearing 2. Because in the first step of demounting, the drive unit 6 is removed from the shaft journal 13, so that the roller bearing handling device 16 can pull up to the roller bearing 2 that is to be demounted. When the replacement is required to be carried out under conditions of absolute gas-tightness, i.e. fully excluding the external atmosphere of the environment, the roller bearing replacement device 14 with the roller bearing handling device 16 that is arranged in the gas-tight housing 17 is moved towards the roller hearth furnace 1 and positioned in such a way that the snout-shaped sluice 18 is pushed over the bearing intermediate plate 23 and lies over the housing flange or flange 21 in a sealing manner. This position is shown in FIGS. 5 to 7 and 12.

In the following, reference is made to the FIGS. 5 to 12, in which a possibility of monitoring the gas-tightness of the docking connection is shown. In order that it can be checked and monitored as to whether the sluice 18 of the roller bearing replacement device 14 is also docked in a gas-tight manner on the flange 21 of the roller hearth furnace 1, it is provided for in the invention at hand that the sluice 18 has a docking flange 25 and a gas-tightness monitoring arrangement 26. With the aid of the gas-tightness monitoring arrangement 26, the gas-tightness of the docking connection of the sluice 18 that is coupled on the roller hearth furnace 1 can be checked or monitored. The docking surface of the docking flange 25 is formed with a projecting, stepped or tiered peripheral rim 29 so that the peripheral rim 29 surrounds or receives the flange 21 of the roller hearth furnace 1 in the docking position. Furthermore the docking flange 25 has two channels or notches (see for example FIGS. 8 to 12) for the respective O-ring seals. The two notches or channels run circumferentially at different radii and are recessed with respect to the flange surface 40 arranged in the peripheral ring 29 (see for example FIG. 9) of the docking flange 25, and form radial recesses 27*a* and 27*b* in each case which again form a bridge or strip 28 between them (see for example FIG. 9). Sealing elements 30*a*, 30*b*, each in the form of O-ring seals are inserted in the radial recesses 27*a* and 27*b* respectively. Consequently, each of the sealing elements 30*a* and 30*b* is arranged in a corresponding radial recess 27*a* and 27*b* which are molded or shaped into the docking flange 25. Now when the docking flange 25 of the roller bearing replacement device 14 docks on to the flange 21 of the roller hearth furnace 1, the flange surface of the flange 21 presses against the sealing elements 30*a* and 30*b*, as shown in FIG. 7 and in FIG. 12 for example. In this position, a radial gap 31 is formed between the flange 21 of the roller hearth furnace 1 and the docking flange 25 of the sluice 18 with its sealing elements 30*a* and 30*b* (see for example FIG. 11), into which a monitoring fluid (for example nitrogen) is injected when the machine is docked or connected. Using the injection or introduction of the monitoring fluid, the docking connection can be checked for gas-tightness on the basis of maintaining pressure over time.

Figure 10:
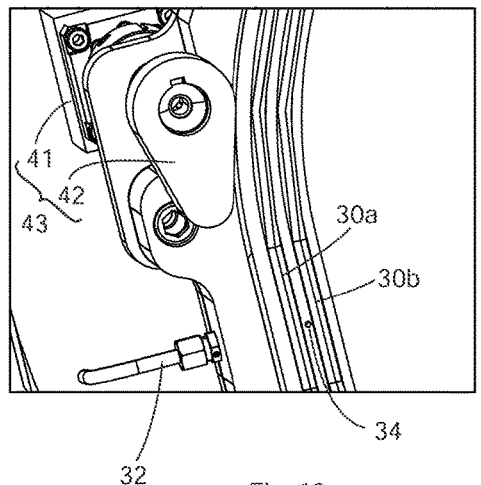
FIG. 10 is a detailed view of a radial gap of the docking flange.

For injecting the monitoring fluid or nitrogen gas the gas-tightness monitoring arrangement 26 includes one monitoring fluid feeding element 32 and two sealing elements 30*a* and 30*b* which are located at different radii on the docking flange 25. The fluid feeding element 32 is formed as a pipe outside the sluice 18 (see FIGS. 5 and 6) and runs outside on the sluice 18 that has the form of a socket or nozzle until the docking flange 25, where the pipe or the fluid feeding element 32 runs radially inwards inside the docking flange 25 and then flows into the said radial gap 31 between the two sealing elements 30*a* and 30*b*. In FIG. 10, the opening 34 between the two sealing elements 30*a* and 30*b* corresponds to the flowing of the fluid feeding element 32.

Figure 11:
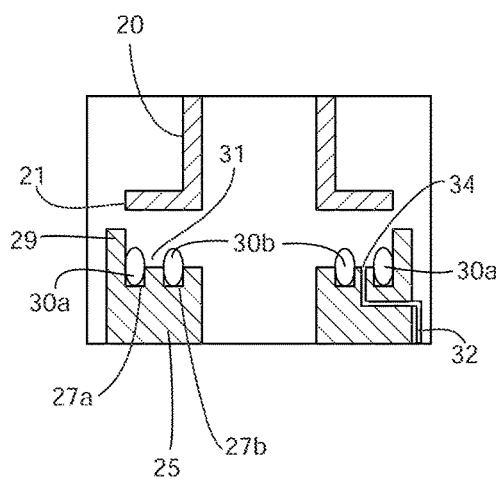
FIG. 11 is a sectional view in top view of the sluice of the roller bearing replacement device and the flange of the roller hearth furnace before the docking of the roller bearing replacement device and FIG. 12 is a sectional view in top view of the sluice of the roller bearing replacement device and the flange of the roller hearth furnace after the docking of the roller bearing replacement device.
Figure 12:
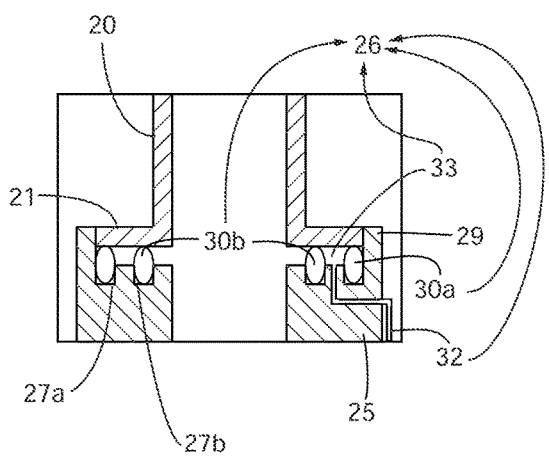

If the sluice 18 is coupled to the roller hearth furnace 1, the radial gap 31 of the docking flange 25 and the flange 21 of the roller hearth furnace 1 form a monitoring chamber 33 that is assigned to the gas-tightness monitoring arrangement 26 (see for example FIG. 12), whereas in the position that is shown in FIG. 11 in which the docking flange 25 has not yet fully travelled onto the Flange 21 and not yet docked, the monitoring chamber 33 is open on the side of the Flange 21. In the docked position, the fluid feeding element 32 introduces the monitoring fluid (for example nitrogen) into the monitoring chamber 33 for monitoring the gas-tightness of the docking connection. Thus the gas-tightness of the docking connection is checked and monitored with the help of the pressure that is built up through the pressure monitoring fluid which is introduced into the monitoring chamber 33 in case of gas-tightness.

In order to pull up the docking flange 25 tightly on the side wall 8 of the furnace 1, the docking flange 25 furthermore has two hydraulic cylinders 41, which grip behind flange 21 of the roller hearth furnace 1 as shown for example in FIG.

5. In other words the sluice 18 has a clamping system 43 which is designed and constructed to couple the docking flange 25 in a form-locking manner with the roller hearth furnace 1. In this the clamping system 43 has a clamping element 42 for each hydraulic cylinder 41 that can be adjusted between the docking position (see FIG. 5) and a base position (see FIG. 6). Each one of the clamping elements 42 is designed and constructed so that it engages the roller hearth furnace 1 in the docking position and disengages the roller hearth furnace 1 in the base position. FIG. 6 shows the base position of the clamping element 42, which is displaced or turned outward in this position, so that the peripheral ring 29 of the docking flange 25 can take in the flange 21. As soon as the flange 21 is received and taken in, the hydraulic cylinders 41 ensure that the clamping element 42 is turned or swiveled radially inwards, by which the clamping element 42 grip the flange 21 of the roller hearth furnace 1 from behind. Consequently the clamping elements 42 can be swiveled in the radial direction in relation to the docking flange 25 and are placed on the sluice 18. Accordingly the assembly 15 with the roller hearth furnace 1 and the roller bearing replacement device 14 and the sluice 18 has the clamping system 43 that has clamping elements 42 which can be adjusted between the docking position and the base position, in which the clamping elements grip behind the flange 21 of the roller hearth furnace 1 (see for example FIG. 5) in the docking position and release the flange 21 in the base position (see for example FIG. 6).

For compensating changes in length caused for example by thermal expansion, the sluice 18 that is shaped like a nozzle has a compensator 44, which in the known manner is a flexible element for compensating movements in pipelines.

In summary, a roller bearing replacement device 14 for replacement or exchange of a roller bearing 2 of a roller hearth furnace 1 is described hereinabove. This roller bearing replacement device 14 includes a housing 17 that can be sealed off from the external environmental atmosphere and at least one roller bearing handling device 16, 16' that is designed and constructed for demounting and installing roller bearings 2. The housing 17 has a sluice 18 that can be coupled on the roller hearth furnace 1 through which access to a roller bearing 2 of the roller hearth furnace 1 that is to be demounted is possible from inside the housing 17 while excluding the external atmosphere. Furthermore the at least one roller bearing handling device 16, 16' is arranged so that it can be moved within the housing 17 and is constructed so that it can be at least partly moved out of the housing 17 through the sluice 18. The sluice 18 has the docking flange 25 and the gas-tightness monitoring arrangement 26, through which the gas-tightness of the docking connection of the sluice 18 that is coupled on the roller hearth furnace 1 can be monitored. In order that the roller bearing replacement device 14 can be connected air-tight on the flange 21 of the roller hearth furnace 1, the flange surface of the docking flange 25 is provided with a double O-ring sealing 30a and 30b. The intermediate space between these seals is filled with nitrogen and monitored for gas-tightness. This takes place by maintenance of pressure over a certain time interval.

Furthermore, an assembly 15 according to the invention is described hereinabove, which has the roller hearth furnace 1 for heat treatment of work pieces 3 and a roller bearing replacement device 14 that is designed and constructed for exchange or replacement of roller bearings 2 of the roller hearth furnace 1, in which the roller hearth furnace 1 has bearing supports 20 with the flange 21 for each of the roller bearings 2 to be supported on the side wall assigned to the roller bearing replacement device 14. Moreover, the roller bearing replacement device 14 has a housing 17 that can be sealed off against the external atmosphere, which includes a sluice 18 that can be coupled on the roller hearth furnace 1 and through which access to a roller bearing 2 of the roller hearth furnace 1 that is to be demounted is possible from inside the housing 17 while excluding the external atmosphere. The at least one roller bearing handling device 16, 16' intended for demounting and installing roller bearings 2 is arranged so that it can be moved within the housing 17 and is constructed so that it can be at least partly moved out of the housing 17 through the sluice 18. In particular, the sluice 18 has the docking flange 25 and the gas-tightness monitoring arrangement 26, by means of which the gas-tightness of the docking connection of the sluice 18 that is coupled on the flange 21 of the roller hearth furnace 1 can be monitored.

Finally, the process according to the invention can be used for carrying out the replacement of roller bearings 2 of a roller hearth furnace 1 with the assembly described hereinabove by means of the roller bearing replacement device 14, in which the roller bearing replacement device 14 is moved laterally near the roller hearth furnace 1 to the position of the roller bearing 2 that is to be demounted, the roller bearing 2 is decoupled from the drive unit 6 and then the roller bearing replacement device 14 is moved towards the roller hearth furnace 1 near the roller bearing 2 that is to be demounted, whereby the sluice 18 of the roller bearing replacement device 14 is coupled on the roller hearth furnace 1 in a gas-tight manner. During docking, the monitoring chamber 33 according to the invention is formed between the flange 21 of the roller hearth furnace 1 and the docking flange 25 of the sluice 18; a pressure monitoring fluid for monitoring gas-tightness of the docking connection is fed into this monitoring chamber 33.

The invention described above is naturally not limited to the embodiment described and depicted. It is obvious that in the embodiment depicted in the drawing numerous manifest or self-evident alterations or modifications can be undertaken according to the intended usage by the specialist, without thereby egressing from the realm of the invention. To the invention belongs all that which is contained in the description and/or depicted in the drawing, including that which deviates from the concrete embodiment and is self-evident or manifest for the specialist.

The invention claimed is:
1. A roller bearing replacement device for replacement of a roller bearing of a roller hearth furnace comprising:
  a housing that can be sealed off from the external atmosphere, which has a sluice that can be coupled to the roller hearth furnace, through which access to a roller bearing of the roller hearth furnace that is to be demounted while excluding the external atmosphere from the inside of the housing, and
  at least one roller bearing handling device that is designed and constructed for demounting and installing of roller bearings, which is placed moveably in the housing and which can be moved out at least partly through the sluice from the housing,
  wherein,
  the sluice has a docking flange and a gas tightness monitoring arrangement, through which the gas-tightness of the docking connection on to the roller hearth furnace with the sluice can be monitored, the sluice has a clamping system, in which the clamping system is designed and constructed so as to couple the docking flange in a form-locking manner with the roller hearth furnace, and the clamping system has at least one clamping element that can be adjusted between a docking position and a base position, wherein the at least one clamping element can be swiveled in the radial direction in relation to the docking flange and is placed on the sluice, the at least one clamping element is designed so as to grip the roller hearth furnace in the docking position and disengage from the roller hearth furnace in the base position, in the base position, the at least one clamping element is displaced or turned radially outwards and releases the flange, and in the docking position, the at least one clamping element is turned or swiveled radially inwards and grips behind the flange of the roller hearth furnace.

2. The roller bearing replacement device according to claim 1, wherein the gas tightness monitoring arrangement has a fluid feeding element for feeding monitoring fluid and at least two sealing elements that are arranged at different radii of the docking flange, in which the at least two sealing elements are shaped in the form of rings and form a radial gap between them into which the monitoring fluid flows.

3. The roller bearing replacement device according to claim 2, wherein each of the sealing elements is arranged in an appropriate radial recess which are molded or shaped into the docking flange.

4. The roller bearing replacement device according to claim 1, wherein the sluice is shaped like a nozzle and has a compensator.

5. An assembly with a roller hearth furnace for heat treatment of work pieces and a roller bearing replacement device designed and constructed for replacement of roller bearings of the roller hearth furnace, in which the roller hearth furnace has on its side wall assigned to the roller bearing replacement device for each roller bearing that is to be supported, a bearing support with a flange, and in which the roller bearing replacement device has a housing that can be sealed off from the outer atmosphere and which has a sluice that can be coupled on to the roller hearth furnace and through which access to the roller bearing of the roller hearth furnace that is to be demounted from the inside of the housing while excluding the environmental atmosphere is possible, and has at least one roller bearing handling device designed and constructed for demounting and installing roller bearings which is arranged in a moveable manner within the housing and which can be at least partly be moved out of the housing thorough through the sluice, wherein, the sluice has a docking flange and a gas tightness monitoring arrangement, by means of which the gas-tightness of the docking connection on to the flange of the roller hearth furnace with the sluice can be monitored, and the sluice has a clamping system with at least one clamping element that can be adjusted between a docking position and a base position, in which the clamping element is configured to swivel in a radial direction in relation to the flange, the clamping element is swiveled radially inwards and grips or engages the flange of the roller hearth furnace in the docking position, and the clamping element is swiveled radially outwards and releases the flange in the base position.

6. An assembly according to claim 5, wherein the gas tightness monitoring arrangement has a fluid feeding element for feeding monitoring fluid and at least two sealing elements that are arranged at different radii of the docking flange, in which the at least two sealing elements are shaped in the form of rings and form a radial gap between them into which the monitoring fluid flows.

7. An assembly according to claim 6, wherein when the sluice is coupled on to the roller hearth furnace, the radial gap of the docking flange and the flange of the roller hearth furnace form a monitoring chamber into which the fluid feeding element feeds the monitoring fluid for monitoring the gas-tightness of the docking connection.

* * * * *